United States Patent [19]

Ong

[11] Patent Number: 4,504,272
[45] Date of Patent: Mar. 12, 1985

[54] SHADING PROCESS USING POLY-FUNCTIONAL REACTIVE AND NON-REACTIVE DYESTUFFS BONDED IN FIXING

[75] Inventor: Sienling Ong, Hofheim am Taunus, Fed. Rep. of Germany

[73] Assignee: Hoechst Aktiengesellschaft, Fed. Rep. of Germany

[21] Appl. No.: 564,017

[22] Filed: Dec. 21, 1983

[30] Foreign Application Priority Data

Dec. 23, 1982 [DE]  Fed. Rep. of Germany ....... 3247727

[51] Int. Cl.³ .................. C09B 62/00; C09B 67/24; D06P 1/38
[52] U.S. Cl. .......................................... 8/543; 8/532; 8/638; 8/918; 8/924
[58] Field of Search ...................... 8/543, 638

[56] References Cited

U.S. PATENT DOCUMENTS 2,459,771  1/1949  Fox ................................. 260/242.2
3,223,470  12/1965  Boedeker et al. ............... 8/548

FOREIGN PATENT DOCUMENTS 36582  9/1981  European Pat. Off. .
40790  12/1981  European Pat. Off. .
65211  11/1982  European Pat. Off. .
923162  4/1963  United Kingdom .

*Primary Examiner*—A. Lionel Clingman
*Attorney, Agent, or Firm*—Connolly and Hutz

[57] ABSTRACT

Color gaps in a product range of reactive dyestuffs are thought of in industry as disadvantageous. The reasons for the existence of gaps can be due to problems of synthesis and reproducibility and also to inadequate wear properties.

In accordance with the invention, it has now been found that such missing shades can be dyed by means of mixtures of reactive dyestuffs containing at least two reactive groups and water-soluble, non-reactive dyestuffs containing at least one reactive hydrogen atom. When dyestuff combinations of this type are applied to fibers containing hydroxyl and/or carboxamide groups, the reactive dyestuff fulfills the function of a linking member between the fiber and the non-reactive shading dyestuff, as a result of which a homopolar bond is formed, and this results in very fast dyeings and prints, while at the same time building up the desired shade.

10 Claims, No Drawings

SHADING PROCESS USING POLY-FUNCTIONAL REACTIVE AND NON-REACTIVE DYESTUFFS BONDED IN FIXING

It is known that there are gaps in the color range of reactive dyestuffs available for industrial use and that these gaps are difficult to fill because of the other requirements a commercial product range has to meet. A coloristic deficiency of this type in a complete spectrum of dyestuffs can refer to technical, chemical or coloristic causes. When adjusting a recipe for dyeing a shade not directly accessible, one is therefore forced in certain cases to have recourse to the use of dyestuff mixtures.

In industry, dyeing to shade is understood as meaning dyeing with dyestuff combinations in such a way that the individual components exhaust as evenly as possible onto the fiber material (the material to be colored) within a specific period of time and at a specific increase in temperature.

So-called shading operations in order to compensate for a deviation from the desired shade are usually carried out in textile printing by adding dyestuffs of the same product range or at least of the same class as those which—selected for their dyeing properties—are offered by the dyestuff manufacturers for the application on the same type of fiber. The reason for this is, above all, the fact that representatives of the same product range have harmonized fixing properties, so that, in a mixture composed of individual components from the same product range, there are no differences in properties during the fixing of the dyestuffs. In the case of reactive dyestuffs, it is even a condition for successful and serviceable shading that only dyestuffs of the same product range shall be used, since this safeguard is most likely to ensure the presence of identical reactive systems, and the conditions for anchoring the dyestuffs in the substrate should then be advantageously uniform. Independently of this it must also be borne in mind that the colorist is restricted in the selection of dyestuffs for a specific shade by the requirements for specific manufacturing and wear fastness properties.

However, it is also known that the quantitative demand for reactive dyestuffs is not distributed uniformly over the individual brands of a product range. As in all commercial dyestuff ranges, there are—seen from the commercial point of view—weak and strong representatives in this range. A few shifts in the consumption of products having certain, rarely required hues may perhaps occur owing to, changes in fashion, but, in general, the sales of the so-called shading dyestuffs remain considerably below those which make up the principal element in the sales of a product range. This fact increases the average manufacturing costs, because the production of the shading dyestuffs which are required for the color range, but which are insignificant in terms of quantity, is more cost-intensive. As a consequence of the small quantities in which they are produced, these dyestuffs make any rationalization measure impossible. In addition, there is still the problem that not every chromophore equipped with a reactive group thereby represents a usable reactive dyestuff. For this—as already mentioned—it is necessary for both the wear properties and the application properties to fit into the framework of the product range. It is also necessary for compounds of this type to be not only reproducible, but also capable of being produced at a comparable cost within the framework of the product range.

The object of the present invention is, therefore, to eliminate the difficulties described above of producing shades, other than those directly available, for dyeing and printing fiber materials containing hydroxyl and/or carboxamide groups with reactive dyestuffs.

It has now been found that product ranges of reactive dyestuffs having continuous color ranges can be obtained without a major technical effort if (a) at least one water-soluble, polyfunctional reactive dyestuff, the molecule of which contains two or more, optionally different, fiber-reactive groupings, or which is capable of forming two or more such groupings under the influence of an acid-binding agent when dyeing or printing the textile material, and (b) at least one water-soluble dyestuff which is not of itself fiber-reactive, the molecule of which contains, or is capable of making available under the influence of an acid-binding agent when dyeing or printing the textile material, one or more reactive hydrogen atoms, preferably linked via nitrogen, oxygen or sulfur, are combined with one another, subject to the proviso that the molar amount of component (a) in dyestuff mixture is at least twice the molar amount of component (b).

The present invention accordingly provides a process for adjusting dyeing recipes in order to dye a shade which is not directly accessible by the normal practice of starting from trade products which dye in a single hue, by having recourse to combinations of components which do not have identical hues and which, when applied to textile substrates containing hydroxyl and/or carboxamide groups, are capable of forming, in the course of a fixing operation at ordinary or elevated temperatures and under the influence of acid-binding agents, homopolar bonds with the said groups of the fiber substance, which comprises selecting dyestuff mixtures which are composed of the components (a) and (b) defined above and which are advantageously employed in quantities conforming with the proviso expressed above.

The process according to the invention thus takes advantage successfully, for dyeing to shade, of the fact that the formation of homopolar bonds between a textile material containing hydroxyl and/or carboxamide groups and water-soluble dyestuffs which are not fiber-reactive and which contain at least one active hydrogen atom in their molecule, can be achieved if a water-soluble reactive dyestuff containing at least two reactive groups is used as the linking member. Admittedly a similar principle of linking can already be taken from British Patent No. 923,162, in which, in accordance with the process described therein, dyestuffs of a substantive character, not having a reactive group of their own but having reactive hydrogen atoms of the same type as component (b), are fixed on cellulose-containing textile material with the aid of colorless, polyfunctional compounds containing at least two $H_2C=CH—CO—$ groups which are attached via nitrogen, for example methylene-bis-acryloylamide or preferably hexahydro-1,3,5-triacryloyl-s-triazine. The practical intention of the measures according to this state of the art can be attributed exclusively to the endeavor to enable dyeings and prints obtained with non-reactive substantive dyestuffs of this type, which of themselves perhaps produce generous color yields, but only produce inadequate wet fastness properties, to enjoy, as a result of the trick of employing the non-dyeing intermediate member, the benefit of the faultless fastness properties which can be achieved by means of a reactive bond with the fiber, whereas the reactive dyestuffs which produce fast dyeings otherwise, of themselves, display only moderate color yields. It is stated that the indirect method mentioned achieves a combination of the respective advantageous application and coloristic properties of the two types of dyestuff; the shades obtainable in accordance with the process of British Patent No. 923,162 accordingly remain unchanged and correspond to those of the substantive dyestuffs. It follows from this that the possibility of effecting, on the basis of the mechanism described, a dyeing to a particular shade, while at the same time safeguarding the latter by means of a reactive bond, has not been taken into consideration in the state of the art known from this British patent.

Suitable polyfunctional reactive dyestuffs of the group (a) are, in accordance with the present invention, the organic compounds which are known under this concept—regardless of the nature of their reactive grouping. This class of dyestuffs is listed in the Colour Index, 3rd Edition 1971, under the generic name "Reactive dyes". These are principally dyestuffs which—at least in duplicate—possess a group capable of reacting with the fiber, a precursor thereof or a substituent capable of reacting with the fiber, for example a radical of the vinylsulfone series, such as $-SO_2-CH=CH_2$, $-SO_2-CH_2-CH_2-Hal$ or $-SO_2-CH_2-CH_2-A$ (in which Hal represents a halogen atom and A represents the acyloxy radical of a monobasic or polybasic acid), or which contain a fiber-reactive monohalogenotriazinyl radical, the reactive groupings being attached at different points in the dyestuff molecule and it being possible for several identical or different reactive groupings to be present. Suitable chromophoric parent substances of compounds of this type are those belonging to the series comprising the azo, anthraquinone and phthalocyanine dyestuffs, it being possible for the azo and phthalocyanine dyestuffs to be employed either in the metal-free form or in a metal-containing form. Apart from the reactive constituent, dyestuffs of this type frequently contain more than one sulfonic and/or carboxylic acid group as substituents which impart solubility in water. Dyestuffs belonging to this category are described, for example, in German Patent Nos. 1,150,164, 1,265,698, 2,001,960, 2,355,703, 2,607,028, 2,614,550 and 2,653,199 and additionally in German Offenlegungsschriften 2,927,102 and 3,019,960.

The non-reactive, water-soluble dyestuffs embraced, in accordance with the invention, by group (b) include, inter alia, compounds which belong to the series comprising the azo, metal complex, anthraquinone and phthalocyanine dyestuffs and which contain at least one active hydrogen atom having the linking character characterized in greater detail, for example in the form of primary or secondary amino groups, sulfonamide or sulfonic acid alkylamide or arylamide groups, carboxamide or carboxylic acid alkylamide groups, hydroxyl groups and/or mercapto groups, or reactive hydrogen atoms which are attached via carbon. Dyestuffs containing methylene ether groups or methylene ester groups which change into methylol groups during the process are also suitable. In addition, the dyestuffs of this type are optionally equipped with substituents which impart solubility in water. With certain exceptions, optical brighteners are also included in the category of compounds according to group (b). Examples of dyestuffs of this type are published in British Patent Nos. 520,199, 908,301, 811,221, 811,222, 900,764, 827,568, 824,300 and 771,320, in German Patent Nos. 742,939 and 335,809 and in U.S. Pat. No. 2,459,771. In addition, group (b) also includes commercial dyestuffs listed in Table I on page 8 of British Patent No. 923,162.

The ratio in which the dyestuffs of the group (a) are mixed with those of group (b) depends on the shading effect desired, the dyestuffs of the group (a) forming, in accordance with the invention, the main component of the mixtures.

The dyestuff mixtures composed in accordance with the present invention make it possible to impart a fast color, in any hue, to fiber materials containing hydroxyl groups as well as those containing carboxamide groups. The new process is employed primarily for dyeing or printing textile material composed of natural and/or regenerated cellulose; it is also used, however, for application to materials composed of natural or synthetic polyamide fibers, in particular wool. It can, of course, also be used for coloring the fiber component containing hydroxyl and/or carboxamide groups in mixed fabrics containing synthetic fibers, for example those composed of polyesters.

The dyestuff mixtures which belong to groups (a) and (b), in which the molar proportion of dyestuffs of the group (a) is always twice as large as that of the group (b), and which are selected in accordance with the claimed process for matching the desired shade, are applied by the nip-padding, padding or printing technique in the presence of acid-binding agents and, if appropriate, also viscosity-regulating agents. In this respect it can be of interest to use, as starting materials, preparations which, in addition to the dyestuff mixtures of the type characterized above, in the prescribed mixing ratio, also contain, if appropriate, dispersing agents and/or protective colloids and/or dyeing or printing auxiliaries. The present invention also relates, therefore, to preparations of the type mentioned.

Acid-binding agents for carrying out dyeing or printing with the dyestuff mixtures formulated in accordance with the invention are preferably inorganic agents having an alkaline reaction, for example especially alkali metal hydroxides or carbonates, but also compounds which turn into agents having an alkaline reaction under the customary conditions of dyeing or printing, for example alkali metal bicarbonates and dialkali metal or trialkali metal phosphates, alkali metal trichloroacetates and others, and it is also possible to use mixtures of these chemicals for regulating the pH.

Apart from the dyestuff mixtures and acid-binding agents, the dyeing liquors and print pastes of the type used in accordance with the invention can contain the customary additives, such as surface-active compounds, anti-migration auxiliaries, solubilizers and fixing auxiliaries for the dyestuffs, or thickeners based on natural and/or synthetic materials.

The liquors and print pastes containing the dyestuff mixtures and the acid-binding agent and also, if appropriate, further additives, can be applied to the fiber material within a wide range of temperatures, preferably at room temperature or at temperatures up to 60° C. The acid-binding agent can, however, also be brought into contact with the textile material before or after the application of the dyeing liquors or print pastes, which then do not contain this agent.

The fixing of the dyestuffs on the textile substrate is optionally carried out subsequently to a previous intermediate drying by the methods customary for reactive dyestuffs, by thermal treatment in an atmosphere of steam or hot air at 100° to 230° C. or by storing under strongly alkaline pH conditions at ordinary or elevated temperatures. The finishing of the colored goods after fixing is identical with that for reactive colorings.

The wear properties of the goods which have been colored using the new process correspond, surprisingly, to those which are otherwise only obtained by means of the reactive dyestuffs of group (a). A great advantage of the dyestuff combinations formulated in accordance with the invention is the fact that it is thereby possible to produce by printing shades which no longer entail problems caused by the staining of the ground by unfixed dyestuffs, when the fixed prints are rinsed and washed. As is known, there is a great tendency, for example for unfixed reactive dyestuffs in which phthalocyanine compounds constitute the chromophore, to stain the print background when the goods are rinsed and washed. This risk of staining becomes even greater if the reactive groups contribute a substantivity additional to that of the phthalocyanine chromophore. Using the dyestuff formulations according to this invention, it is possible, for example, to produce green mixtures containing a major quantity of yellow reactive dyestuffs of group (a) and a minor quantity of phthalocyanine derivatives belonging to group (b). When fixing is carried out, the phthalocyanine molecules are then completely anchored to the fiber by means of the molecules of the yellow reactive dyestuff and, as a result, can no longer stray into the rinsing or washing water. This fact is important in printing, for the reason that the straying, unfixed residues of dyestuff can considerably reduce the value of the printed goods through staining.

A further finding which is also significant is that it is possible to avoid undesirable alterations in shade on the goods by means of the process according to the invention. The shade of prints or dyeings is often altered permanently by light or by the combined effect of light and perspiration. Insofar as this relates to a black reactive dyestuff containing at least two reactive groups, it is now possible to counteract this alteration in shade by shading in accordance with the claimed process. For example, prints containing the dyestuff Reactive Black 5, corresponding to C.I. No. 20,505, turn brownish under the influence of light in the presence of perspiration. By shading with one of the blue dyestuffs from the patents mentioned, however, it is possible to prevent this browning of the black shade.

EXAMPLE 1

A cotton fabric is printed with a print paste of the composition below, prepared as follows:

50 g of the reactive dyestuff (reddish yellow) according to Example 2 of German Offenlegungsschrift 2,927,102 are dissolved, together with
20 g of dyestuff No. 19 (red) from TABLE II on page 12 of British Patent 923,162 and
100 g of urea, in
300 ml of water.
20 g of sodium bicarbonate,
450 g of a 4% strength aqueous solution of a high-molecular sodium alginate and
60 g of water or alginate solution are also added and the mixture is processed by stirring to give
1,000 g of print paste.

After drying, the print is fixed for 5 minutes by treatment with saturated steam at 102° C. The goods thus treated are then first rinsed with water and then washed in a conventional manner. After further rinsing with water, the resulting print is centrifuged and finally dried.

Fast, brilliant scarlet prints are obtained on the ground of white cotton fabric.

EXAMPLE 2

A cellulose fabric is impregnated on a pad-mangle at room temperature and at a liquor pick-up of 80% (relative to the weight of the dry goods) with an aqueous padding liquor containing, per liter:

50 g of the reactive dyestuff (red) according to Example 8 of German Patent 1,265,698,
20 g of the dyestuff Acid Yellow 98 (greenish yellow) of C.I. No. 14,006,
20 g of sodium bicarbonate,
810 ml of water and
100 g of a 4% strength aqueous solution of sodium alginate.
1,000 g.

Subsequently to intermediate drying, the padded goods are subjected to fixing in accordance with Example 1 and are finished as described therein.

A yellowish red dyeing having good wet and light fastness properties is obtained on the textile material.

EXAMPLE 3

A print paste containing the following ingredients is applied to a fabric composed of cellulose fibers:

80 g of the reactive dyestuff (yellow) according to Example 3 of German Offenlegungsschrift 3,019,960,
20 g of dyestuff No. 14 (blue) from TABLE II on page 11 of British Patent 923,162,
20 g of sodium bicarbonate,
50 g of urea,
500 g of a 4% strength aqueous solution of a long-chain alginate and
330 ml of water.
1,000 g of print paste.

The printed pattern produced in this manner is fixed by steaming as in Example 1, after drying.

After finishing, brilliant green prints having very good wet and light fastness properties are obtained on a pure white ground.

I claim:

1. In a process for adjusting dyeing recipes in order to dye a shade which is not directly accessible by the normal practice of starting from trade products which dye in a single hue, by having recourse to combinations of components which do not have identical hues and which, when applied to textile substrates containing hydroxyl and/or carboxamide groups, are capable of forming, in the course of a fixing operation at ordinary or elevated temperatures and under the influence of acid-binding agents, homopolar bonds with the said groups of the fiber substance, the improvement which comprises selecting dyestuff mixtures which are comprised of:

(a) at least one water-soluble, polyfunctional reactive dyestuff, the molecule of which contains two or more, optionally different, fiber-reactive groupings, or which is capable of forming two or more such groupings under the influence of an acid-binding agent when dyeing or printing the textile material, and (b) at least one water-soluble dyestuff which is not of itself fiber-reactive, the molecule of which contains, or is capable of making available under the influence of an acid-binding agent when dyeing or printing the textile material, one or more reactive hydrogen atoms.

2. The process as claimed in claim 1, wherein the molar amount of component (a) in the dyestuff mixture is at least twice the molar amount of component (b).

3. The process as claimed in claim 1, wherein said reactive hydrogen atoms are linked to the dyestuff molecules of component (b) via nitrogen, oxygen, or sulfur.

4. A process for dyeing or printing textile substrates containing hydroxyl and/or carboxamide groups, which comprises adjusting the dyeing recipe according to claim 1, thereby applying dyestuff mixtures comprising:

(a) at least one said water-soluble polyfunctional reactive dyestuff according to said component (a), (b) at least one said water-soluble dyestuff according to said component (b) which is not of itself fiber-reactive, to the fiber material by the nip-padding, padding or printing technique, the dyestuffs being fixed on fiber material at ordinary or elevated temperatures in the presence of an acid-binding agent.

5. A process according to claim 4, wherein the reactive hydrogen atoms of the dyestuff of said component (b) are linked to the molecules of said dyestuff via nitrogen, oxygen, or sulfur.

6. A process according to claim 4, wherein the molar amount of said water soluble polyfunctional reactive dyestuff according to said component (a) is at least twice the molar amount of said water-soluble dyestuff according to said component (b).

7. A preparation for dyeing or printing textile substrates containing hydroxyl and/or carboxamide groups, which contains a dyestuff mixture comprised of:

(a) at least one water-soluble, polyfunctional reactive dyestuff, the molecule of which contains two or more, optionally different, fiber-reactive groupings, or which influence of an acid-binding agent when dyeing or printing the textile material, and (b) at least one water-soluble dyestuff which is not of itself fiber-reactive the molecule of which contains, or is capable of making available under the influence of an acid-binding agent when dyeing or printing the textile material, one or more reactive hydrogen atoms.

8. A preparation as claimed in claim 7, wherein the molar amount of component (a) in the dyestuff mixture is at least twice the molar amount of component (b).

9. A preparation as claimed in claim 7, which further comprises:

(c) a dispersing agent, a protective colloid, a dyeing or printing auxiliary, or mixtures thereof.

10. A preparation as claimed in claim 7, wherein said reative hydrogens are linked to the dyestuff molecules of component (b) via nitrogen, oxygen, or sulfur.

* * * * *